Nov. 4, 1952     J. KARITZKY     2,616,327
TOGGLE BOLT
Filed June 28, 1950
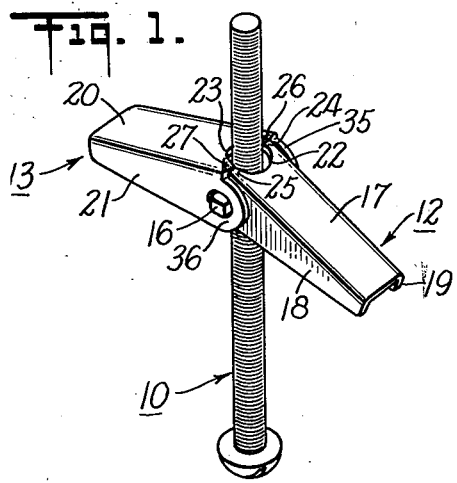
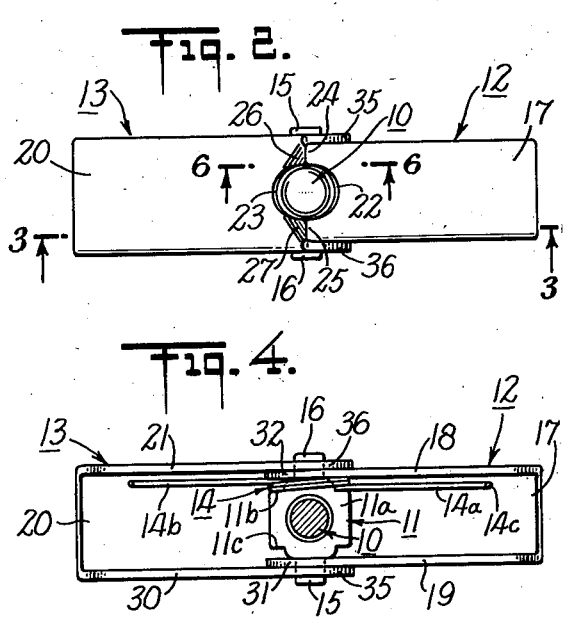
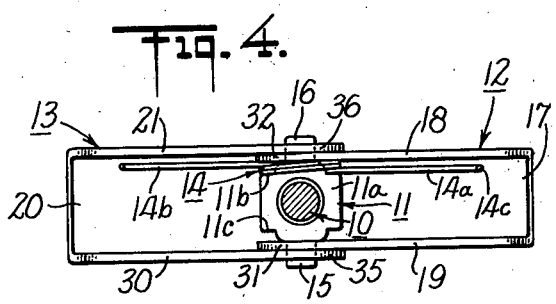
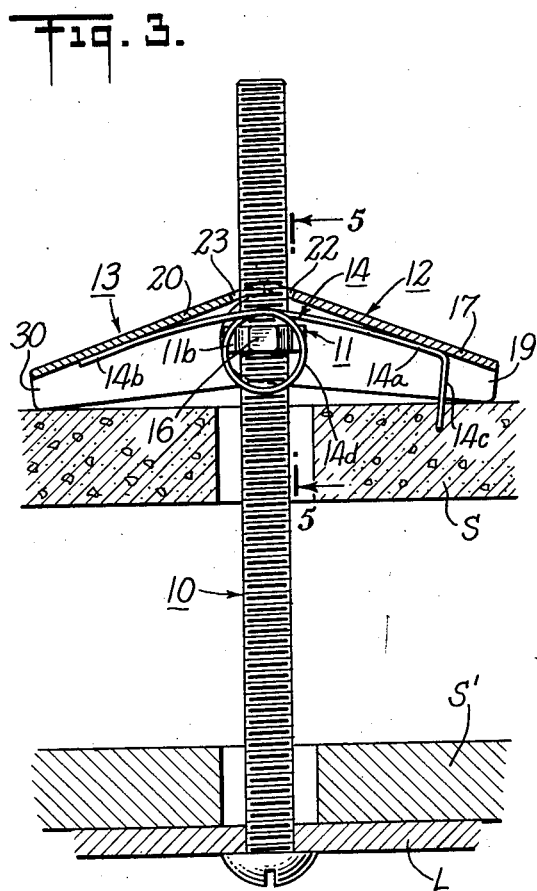
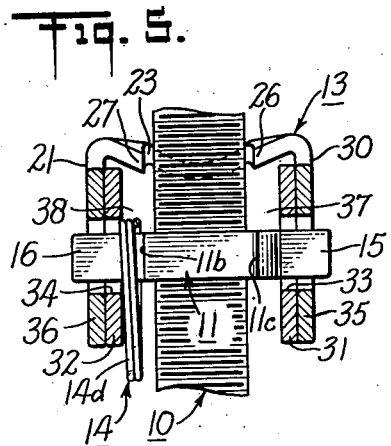
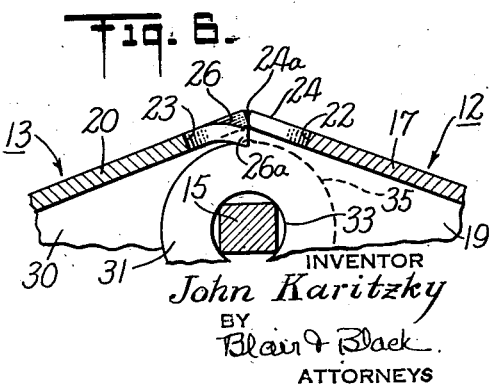
INVENTOR
John Karitzky
BY
Blair & Black
ATTORNEYS Patented Nov. 4, 1952

2,616,327

UNITED STATES PATENT OFFICE 2,616,327

TOGGLE BOLT

John Karitzky, Cranford, N. J., assignor to Diamond Expansion Bolt Company, Inc., Garwood, N. J.

Application June 28, 1950, Serial No. 170,859

2 Claims. (Cl. 85—3)

This invention relates to fastening devices and more particularly to an improvement in toggle bolts.

Toggle bolts are of course well known and have been widely used for many years. Indeed there are today commercially acceptable toggle bolts that in many instances satisfactorily fulfill most requirements. There are, however, to the extent that I have been able to determine, several deficiencies in such devices. Toggle bolts are provided in various weights and sizes depending on the loads they have to support. If the various stresses imposed on a given toggle bolt during its installation are such as to jeopardize its holding capacity under the constant load it has to bear, a dangerous condition results. In most cases, due to the nature of the toggle bolt and the fact that its wings, when installed, are concealed, visual observation of the bolt's condition after installation is obscured. Hence if the bolt is overloaded, or of the elastic limit of the wings is exceeded, such condition can not be determined; hence it follows that the continued imposition of the load under various conditions, as for example, vibration, results in a varying stress that might well result in failure of the bolt.

One of the principal types of failure is buckling of the wings adjacent their pivots on the nut through which the toggle bolt screw extends. These wings are customarily stamped from sheet metal and are characterized by abutting edges in the region of the screw, which abutting edges limit the expansion of the wings. In conventional toggle bolts these portions of the wings are frequently the first to fail under excessive loads and upon failure permit the wings to overexpand to the extent that the outer wing overlies the under, this condition resulting not only in an over-all weakening of the device but also a binding of the screw which under certain circumstances makes difficult or impossible release of the bolt.

True it is that most fastening devices of this nature are so designed as to have a reasonable factor of safety, but because of the inherent structural limitations of conventional toggle bolts the factor of safety often proves inadequate particularly where the mechanic installing the device overstresses it or where, accidentally or otherwise, an undersized toggle is used in relation to the load it has to support.

There is another bothersome characteristic of most conventional toggle bolts arising from the action of the wing-expanding spring. These springs are usually coiled around one of the wing pivots that extends from the toggle bolt nut, the nut and spring relation being such that not infrequently the spring takes a set in such a direction that the spring loop underlies the hole in the nut precluding ready entrance of the screw therein. While this characteristic does not weaken the toggle bolt, it does interfere with the ready assembly of the toggle bolt with the resulting inconvenience and increase in cost thereof.

It is accordingly among the objects of my invention to provide a simple, inexpensive, durable and highly utile toggle bolt that overcomes the aforementioned disadvantages in a thoroughly practical and efficient manner.

In the drawing wherein I have shown one of several possible embodiments of my invention, Figure 1 is a perspective view of the toggle bolt, Figure 2 is an enlarged top plan view of the device, Figure 3 is a vertical section of the toggle bolt shown in a typical installation and as taken along the line 3—3 of Figure 2, Figure 4 is a bottom plan view of the toggle bolt, Figure 5 is an enlarged fragmentary section taken along the line 5—5 of Figure 3, and Figure 6 is an enlarged fragmentary vertical section taken along the line 6—6 of Figure 2.

Similar reference characters refer to similar parts throughout the various views of the drawing.

In accordance with a preferred embodiment of my invention the toggle bolt comprises a screw which threadably receives a nut having opposed radially extending lugs or fingers providing trunnions which pivotally support inner and outer wings. These wings are channel-shaped in cross-section and at their inner pivoted ends are cut out to provide a passage for the screw. These cut-outs provide a pair of abutment shoulders on opposite sides of each cut-out with the pair of shoulders on one wing end coacting with those on the other to limit the opening movement of the wings. The shoulders on the outer wing, however, are bent downwardly out of the plane of the channel top wall so that they engage the opposed shoulders on the inner wing respectively at points well spaced outwardly of the cut-out on the inner wing where the inner wing shoulders are weakest. In other words the bent in outer wing shoulders abut the inner wing shoulders at points closely adjacent the inner wing side walls, i. e. at the strongest portions of the inner wing shoulders. By the same token the inner wing shoulders abut the outer wing shoulders at their strongest points, i. e. at the portions thereof adjacent the outer wing side walls. This relationship substantially increases the load bearing capacity of the toggle bolt and materially lessens its tendency to fail under overload conditions.

As noted above the nut has oppositely extending wing pivot lugs. These lugs extend from the body of the nut, the nut body being flattened adjacent the base of each lug so as to provide clearances on opposite sides of the nut adjacent the inner wing side walls. Either of these clearances may be used for installation of the wing expanding spring, the clearances being such that when the spring coil is installed, it remains parallel to the screw axis and accordingly does not take an angular set such that the spring coil would underlie the hole in the nut and interfere with threading the screw therein.

Referring now to Figure 1 of the drawing, the toggle bolt comprises in general a screw 10, a nut 11 (Figure 4), an inner wing 12 (Figure 1), an outer wing 13, and a wing expanding spring 14 (Figure 3). Screw 10 threadably receives nut 11 and the nut is provided with oppositely extending lugs 15 and 16 (Figure 4) which pivotally support inner and outer wings 12 and 13. Spring 14 is so wound and installed that its ends 14a and 14b (Figure 3) exert a constant opening bias on wings 12 and 13 respectively. The extremity of spring end 14a is preferably bent downwardly as at 14c to provide a sharp projection adapted to engage or penetrate the surface S against which the wings expand to preclude relative rotation between the wings and this surface during expansion of the toggle bolt.

As may be seen from Figures 2 and 4, wings 12 and 13 are channel-shaped in cross-section; thus wing 12 (Figure 4) includes a top surface 17 and side walls 18 and 19 which extend at right angles from top wall 17. Similarly outer wing 13 includes a top wall 20 and right angle side walls 21 and 30. Top wall 17 (Figure 2) of inner wing 12 has a semicircular cut-out 22, the top wall 20 of outer wing 13 having a similar and matching cut-out 23. These cut-outs 22 and 23 accordingly provide a generally circular opening or passage through which screw 10 extends when the component parts of the toggle bolt are assembled.

Inner wing cut-out 22 provides a pair of shoulders 24 and 25 while outer wing cut-out 23 provides complementary shoulders 26 and 27. Inner wing shoulders 24 and 25 lie in the same plane as top 17. Outer wing shoulders 26 and 27 however, as is more clearly shown in Figures 5 and 6, are bent inwardly of the plane of outer wing top wall 20 so that the extremity 26a (Figure 6) of shoulder 26 underlies the extremity 24a of inner wing shoulder 24. In a similar manner the extremity of outer wing shoulder 27 underlies the extremity of inner wing shoulder 25. As a result of the inter-relationship of the inner and outer wing shoulders the points of engagement of these shoulders, i. e. the points at which they abut to limit the opening movement of the wings, are respectively closely adjacent the side walls of the two wings. The two wings are of course most rigid along the bends between their top and side walls and hence these are the portions of the two wings that are best able to withstand stresses resulting from the load carried by the toggle bolt. If these stresses were exerted on the wings at the extremities of the wing shoulders adjacent screw 10 and with shoulders 26 and 27 unbent, the tendency would be for the outer wing shoulders to bend upwardly and the inner wing shoulders to bend downwardly with the inner end of the outer wing accordingly riding over the inner end of the inner wing. Such action would, of course, narrow the screw opening formed by cut-outs 22 and 23 causing the wing tops 17 and 20 to engage against and accordingly bind screw 10, making difficult or impossible removal thereof.

Expressed in another way, by inturning outer wing shoulders 26 and 27 as described the bending moment on inner wing shoulders 24 and 25 is materially reduced so that the stresses exerted by the outer wing shoulders are directed to the most rigid and unyielding portions of the inner wing shoulders which portions are closely adjacent the bends between inner wing top wall 17 and side walls 18 and 19. This is, of course, true of the oppositely directed stresses from the inner wing shoulders on the outer wing shoulders, i. e. such stresses are supported at those portions of the outer wing shoulders immediately adjacent the bends between the outer wing top wall 20 and side walls 21 and 30. Thus it follows that the tendency of the outer wing to override the inner wing under the imposition of the load thereon is much more effectively resisted and contained when the abutment of the engaging wing shoulders is confined to the regions described.

At the inner end of inner wing 17 I have provided opposed ears 31 and 32 (Figure 4) which, as shown in Figure 5, are pierced at 33 and 34 to receive lugs 15 and 16 of nut 11. In a generally similar fashion, outer wing 13 has ears 35 and 36 similarly pierced for the nut lugs. The inner and outer wing ears extend beyond the wing shoulders so that the trunnion holes in the ears are approximately vertically disposed beneath the wing shoulders. This relationship advantageously provides adequate load bearing capacity with a minimum amount of material.

As may be seen in Figure 3, nut 11 is formed from a flat piece of metal and is so stamped or otherwise fabricated as to include a square body portion 11a (Figure 4) and flat sides or shoulders 11b and 11c from which lugs or trunnions 15 and 16 extend. These flats 11b and 11c are so proportioned and located relative to inner wing side walls 18 and 19 as to provide spaces or clearances 37 and 38 (Figure 5) between the nut body flats and the opposed inner wing side walls 18 and 19 respectively. Spring 14 may accordingly be installed in either of these clearances.

In Figure 5 coil 14d of spring 14 is shown installed about trunnion 16 in clearance 38 with the upper portion of the spring coil resting on top of the trunnion. The spring loop 14d (Figure 3) will naturally assume this position because of the upward bias of spring ends 14a and 14b; hence the upper portions of the spring loop will rest against and accordingly be supported by flat 11b of nut 11. This inter-relationship of the spring loop and the nut tends to maintain the spring loop in a generally vertical position thus preventing the lower portion of the spring loop from slanting angularly toward the axis of nut 11 where it would impede entry of screw 10 into nut 11.

As installation of a toggle bolt of the general nature of that disclosed herein is well understood, it will suffice to say that my toggle bolt is used in the customary manner as for example in the manner shown in Figure 3; hence the screw extends through surfaces S and S' to support load L.

Thus it may be seen that I have provided an improved toggle bolt that attains the several objects set forth hereinabove in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In a toggle bolt, in combination, a screw, a nut threaded on said screw, said nut including oppositely extending trunnions, an inner wing member and an outer wing member, each said wing member being of substantially U-shaped cross-section and pivotally mounted on the trunnions, the trunnion engaging end portions of the inner wing member being arranged in telescoping relationship with the trunnion engaging end portions of the outer wing member, each of said wing members having a flat top surface with a semi-circular cut-out at the trunnion engaging end thereof, the cut-outs being of less diameter than the width of the top surface of the inner wing member, said cut-outs defining a central opening through which the screw may enter when the wing members are mounted one within the other on the trunnions, and means to limit the opening movement of the wing members comprising shoulder portions defined by and between the edges of the cut-outs and the sides of the wings, the corner portions of the shoulders of the outer wing member, adjacent their intersection of the end of the flat surface of the wing, being bent inwardly of the plane of said surface so as to cross the opposed surfaces of the corresponding shoulders of the inner wing member, whereby opening movement of said wing member is limited by substantial face to face engagement of the mutually opposed shoulders, the said contact areas of the shoulders being spaced from and in substantially vertical alignment with the pivot points of the wings on the trunnions.

2. A toggle bolt in accordance with claim 1, wherein said nut has on at least one side thereof a flattened portion which provides a clearance between the body of the nut and the adjacent wing member side, and a coil spring installed in said clearance and about the associated trunnion and having oppositely extending ends bearing against said wing members to bias them toward open position.

JOHN KARITZKY.

REFERENCES CITED

The following references are of record in the file of this patent:

UNITED STATES PATENTS

| Number | Name | Date |
| --- | --- | --- |
| 1,224,698 | Zifferer | May 1, 1917 |
| 1,228,512 | Zifferer | June 5, 1917 |
| 1,396,278 | Paine | Nov. 8, 1921 |
| 1,643,592 | Soss | Sept. 27, 1927 |
| 1,956,623 | Pleister | May 1, 1934 |
| 2,061,634 | Pleister | Nov. 24, 1936 |